United States Patent
Trevelyan et al.

(10) Patent No.: US 8,018,525 B2
(45) Date of Patent: Sep. 13, 2011

(54) CAMERA FLASH MODULE AND METHOD FOR CONTROLLING SAME

(75) Inventors: Philip Trevelyan, Camberley (GB); Angel Ivanov, Sofia (BG); Emil Kirilov, Vidin (BG); Ivan Vasilev, Sofia (BG)

(73) Assignee: Nokia Corporation, Espoo (FI)

( * ) Notice: Subject to any disclaimer, the term of this patent is extended or adjusted under 35 U.S.C. 154(b) by 462 days.

(21) Appl. No.: 12/316,917

(22) Filed: Dec. 17, 2008

(65) Prior Publication Data
US 2009/0160944 A1   Jun. 25, 2009

Related U.S. Application Data

(60) Provisional application No. 61/016,244, filed on Dec. 21, 2007.

(51) Int. Cl.
*H04N 5/222* (2006.01)
*H04N 5/235* (2006.01)
*H04N 9/73* (2006.01)

(52) U.S. Cl. .................... 348/371; 348/221.1; 348/224.1

(58) Field of Classification Search .................. None
See application file for complete search history.

(56) References Cited

U.S. PATENT DOCUMENTS

| | | | |
|---|---|---|---|
| 6,885,405 B1 * | 4/2005 | Steinberg et al. | 348/371 |
| 7,423,674 B2 * | 9/2008 | Takeshita | 348/223.1 |
| 2001/0019364 A1 * | 9/2001 | Kawahara | 348/362 |
| 2002/0150306 A1 | 10/2002 | Baron | 382/275 |
| 2007/0047945 A1 * | 3/2007 | Nose et al. | 396/157 |
| 2007/0201853 A1 | 8/2007 | Petschnigg | 396/155 |
| 2008/0158376 A1 * | 7/2008 | Miki | 348/222.1 |
| 2008/0252749 A1 * | 10/2008 | Fujiwara | 348/224.1 |
| 2009/0109316 A1 * | 4/2009 | Matsui | 348/333.01 |

FOREIGN PATENT DOCUMENTS

EP   1765006 A1   3/2007

OTHER PUBLICATIONS

Digital Photography with Flash and No-Flash Image Pairs, Georg Petschnigg, Maneesh Agrawala, Hugues Hoppe, Richard Szeliski, Michael Cohen, Kentaro Toyama, Microsoft Corporation, XP-002398974, Aug. 8, 2004, pp. 664-672.

* cited by examiner

*Primary Examiner* — Lin Ye
*Assistant Examiner* — John H Morehead, III
(74) *Attorney, Agent, or Firm* — Ware, Fressola, Van Der Sluys & Adolphson LLP

(57) ABSTRACT

An auto-exposure algorithm for controlling a camera flash uses image processing to identify important areas of the image affected by the flash, while disregarding highly reflective/illuminated areas and uses a ND filter to linearize the flash triggering with highly reflective scenes. The camera flash is controlled by the auto-exposure algorithm in two stages: a pre-flash stage followed by a main-flash stage. In the pre-flash stage, two images are captured under the same camera settings regarding the exposure time, gain, iris and resolution. One image is captured with flash and one without. From the difference between the two images, a reference pixel is used to determine the flash intensity in the main-flash stage.

18 Claims, 3 Drawing Sheets

CAMERA FLASH MODULE AND METHOD FOR CONTROLLING SAME

This application claims priority and benefits to U.S. Patent Application Ser. No. 61/016,244, filed Dec. 21, 2007.

FIELD OF THE INVENTION

The present invention relates generally to a camera flash module and, particularly, to a camera flash module controlled by an auto-exposure algorithm.

BACKGROUND OF THE INVENTION

When taking pictures under inadequate ambient light, such as in total darkness or in low light, a camera flash is commonly used. Also, a camera flash can be used for fill-in purposes even when the ambient light is not low. While camera flashes, such as xenon flashes, can provide a high intensity light source to illuminate a scene to a great distance, they cannot be easily controlled to produce a consistent amount of light. It is known that the amount of light produced by a xenon flash can be increased or decreased by controlling the width of the trigger pulse. When the pulse width is short, the flash intensity can vary significantly. Thus, it is advantageous to provide a method for controlling a camera flash so as to improve the repeatability in flash intensity.

SUMMARY OF THE INVENTION

The present invention is concerned with an auto-exposure algorithm for controlling a camera flash. The algorithm uses image processing to identify important areas of the image affected by the flash, while disregarding highly reflective/illuminated areas and uses a ND filter to linearize the flash triggering with highly reflective scenes.

The use of a camera flash in the process of taking a picture, according to the present invention, is controlled by an auto-exposure algorithm in two stages: a pre-flash stage followed by a main-flash stage. Before the pre-flash stage, image data from images during the preview period is also used by the auto-exposure algorithm to control the camera flash illumination. The flash illumination or intensity can be adjusted from a minimum intensity to a maximum intensity by adjusting the width of the trigger pulse applied to the camera flash and by using an iris or a neutral density filter.

In the pre-flash stage, two images are captured under the same camera settings regarding the exposure time, gain, iris and resolution. One image, referred to as a dark image, is captured without using the flash. Another image, referred to as a min_flash image, is captured with a minimum flash intensity. The exposure time of these two pre-flash stage images is determined by the average brightness of the scene obtained during the preview period. This prevents the pre-flash stage images from overexposing.

The pre-flash stage images contain information about the ambient illumination and the influence of the flash with minimum intensity. This information is used by the auto-exposure algorithm to control the flash intensity in the main-flash stage. In particular, a difference image is obtained by subtracting the dark image from the min_flash image. Because the min_flash image is different from the dark image only by the flash usage, the difference image contains mainly areas influenced by the flash. This influence is evaluated by searching the pixel with the greatest value in the difference image. This particular pixel, referred to as the important pixel, is considered as part of the object which is the most influenced by the flash usage in the pre-flash stage. The luminance of the important pixel in the two pre-flash stage images is used to estimate an appropriate flash intensity in the main-flash stage. If some pixels in the min_flash image are likely to be the result of mirror reflection, these pixels will not be taken in consideration by the auto-exposure algorithm. Furthermore, pixels that belong to small objects will also be eliminated.

Using a look-up table, for example, the main-flash intensity and the exposure, the gain and the iris for capturing the main-flash stage image can be determined.

Thus, the first aspect of the present invention is a method for controlling the flash intensity using an automatic exposure algorithm. The method comprises:

capturing a first test image without using a flash;

capturing a second test image using the flash with a predetermined intensity, wherein the predetermined intensity is a minimum intensity;

obtaining a difference image indicative of a difference between the second test image and the first test image, wherein the difference image comprises a plurality of difference image pixels, each difference image pixel having a pixel value;

identifying a reference pixel among the difference image pixels, wherein the first test image comprises a first test pixel corresponding to the reference pixel, and the second test image comprises a second test pixel corresponding to the reference pixel, wherein the reference pixel is identified based at least partly on a highest pixel value among the difference image pixels; and computing illumination amount by the flash for subsequent image capturing based at least partly on pixel value of the first test pixel and pixel value of second test pixel.

According to various embodiments of the present invention, before identifying the reference pixel, it is desirable to remove some of the difference image pixels, such as pixels belonging to objects smaller than a predetermined size and pixels belonging to reflective objects.

According to various embodiment of the present invention, the camera settings, including the exposure time and the predetermined intensity of the flash, for the capturing of the first test image and the second test image, are computed. In particular the average luminance of one or more preview images are used to determined the predetermined intensity of flash such that average luminance of the second test image is within a predetermined range, so as to prevent the second test image from being underexposed or overexposed.

According to various embodiments of the present invention, the illumination amount by the flash for the subsequent image capturing is achievable by causing the flash to provide flash intensity by a trigger pulse having a pulse width, wherein when the pulse width is smaller than a predetermined value, the pulse width is increased and the flash intensity is reduced accordingly by using a neutral density filter or an iris so as to maintain the illumination amount by the flash or to preserve the ratio of the gain to the intensity reduction factor.

According to various embodiments of the present invention, before determining the illumination amount by the flash, the correctly illuminated areas in the first test image and correcting areas in the second test image are removed, wherein the correctly illuminated areas are identified by determining areas in the first test image that have pixel values within a certain predetermined range.

The second aspect of the present invention is a computer readable storage medium embedded therein a software program for use in a camera, wherein the software program comprises programming codes for carrying out the method for controlling the flash intensity using an automatic exposure algorithm.

The third aspect of the present invention is a flash module for use in a camera, the module adapted to control a camera flash. The module comprises:

a mechanism for triggering the camera flash; and a processor arranged to receive image data from the camera, wherein the processor is adapted to carry out:

capturing a first test image without using the camera flash;

capturing a second test image using the camera flash with a predetermined intensity;

obtaining a difference image indicative of a difference between the second test image and the first test image, wherein the difference image comprises a plurality of difference image pixels, each difference image pixel having a pixel value;

identifying a reference pixel among the difference image pixels, wherein the first test image comprises a first test pixel corresponding to the reference pixel, and the second test image comprises a second test pixel corresponding to the reference pixel; and computing illuminating amount of the flash for subsequent image capturing based at least partly on pixel value of the first test pixel and pixel value of the second test pixel.

According to various embodiments of the present invention, the processor comprises a software program having programming codes for performing the tasks of obtaining, identifying and computing.

The fourth aspect of the present invention is a camera having a flash module as described above.

The present invention will become apparent upon reading the description taken in conjunction with FIGS. 1 to 4.

DETAILED DESCRIPTION OF THE INVENTION

Figure 1:
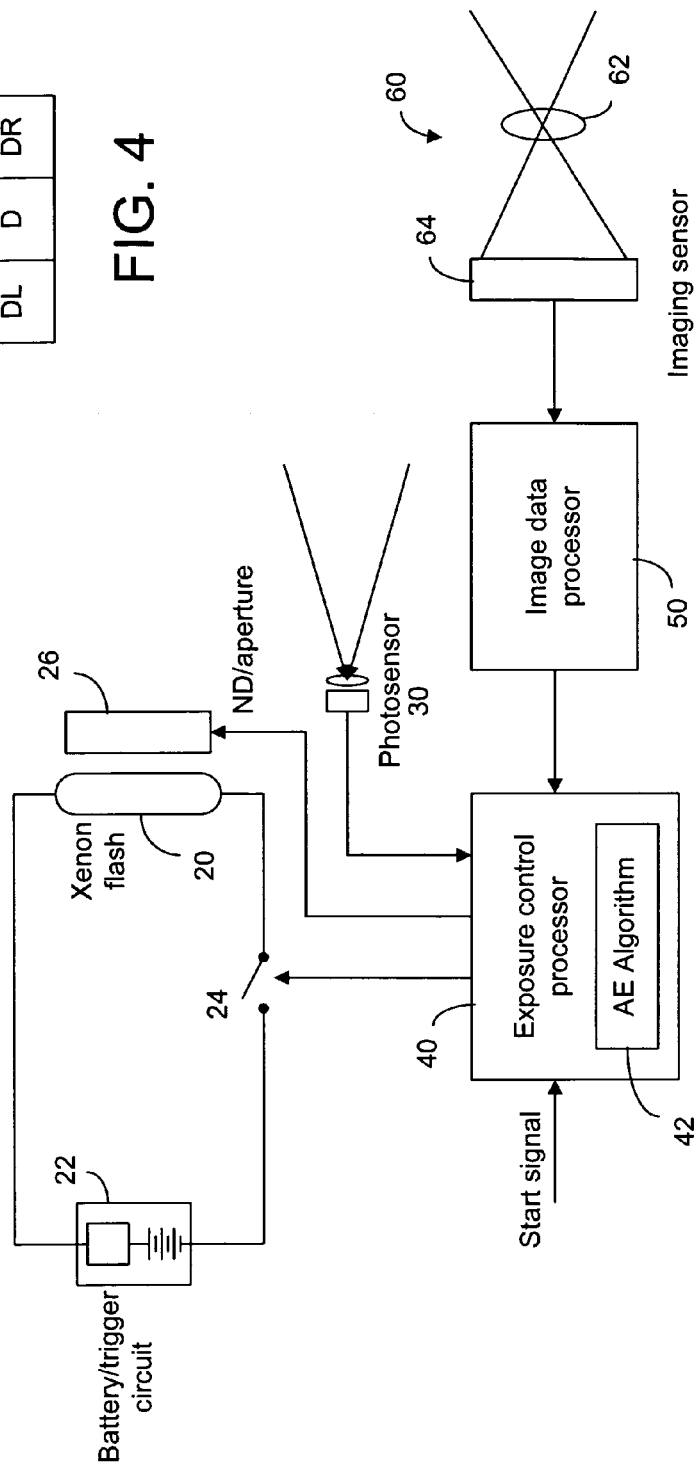
FIG. 1 is a block diagram showing the camera flash module, according to embodiments of the present invention.

The present invention is concerned with controlling the amount of light provided by a camera flash when taking pictures. As shown in FIG. 1, the camera flash 20 is powered by a power source 22 and triggered by a trigger pulse provided by a trigger control 24. A flash intensity attenuator or reducer, such as a mechanical iris or a neutral density (ND) filter 26 can be placed in front of the camera flash 20 to reduce the flash intensity. An exposure control module 40 having a software program 42 embedded in a computer readable storage medium to implement a flash intensity control algorithm based on the ambient light, the nature of the scene and the photographic mode, for example. A photosensor 30 can be used to detect the scene brightness with or without flash light, for example. In addition, image data from the camera 60 is used in the auto-exposure calculation. Typically, the camera 60 has an imaging sensor 64 and one or more lenses 62 to form an image on the imaging sensor 64. The image data from the imaging sensor 64 is read out in a controlled manner and processed by an image data processor 50 before the image data is provided to the exposure control module 40.

According to the present invention, the camera flash illumination can be partially controlled by the width of the trigger pulse. For example, the width of the trigger pulse can be 5 μs to 250 μs. When the pulse width is small, the flash intensity of a xenon flash can be inaccurate. This means that, when the pulse width is small, the intensity may vary significantly with the same pulse width. In one embodiment of the present invention, a neutral density filter is placed in front of the camera flash in order to attenuate the flash intensity. At the same time, the pulse width is increased proportionally in order to compensate for the attenuation. For example, if the neutral density filter that allows one fifth of the flash light to pass through and the target pulse width of the trigger pulse as calculated by the exposure control module 40 is 5 μs, the pulse width will be increased to 25 μs. The variation of the flash intensity with a pulse width of 25 μs is much smaller and thus the flash illumination is more accurate and repeatable. When attenuation of flash intensity is not needed, the neutral density filter is moved out of the illumination path.

Likewise, an aperture or a mechanical iris can also be used to reduce the amount of flash light that reaches the scene. Unlike a neutral density filter which has a fixed attenuation factor, the iris will also affect the Depth of Field as well as attenuate the light which may affect picture taken in Macro situations. Thus, the iris can be opened wide when the calculated pulse width exceeds a certain level so that the iris has no effect on the flash intensity. Also, the size of the smaller size iris can be used so that the intensity reduction factor can vary with the calculated pulse width. For example, if the calculated pulse width is 5 μs, the iris can be adjusted such that only one fifth of the flash light is allowed to reach the scene. But when the calculated pulse width is 10 μs, another iris can be selected so that two fifths of the flash light will reach the scene. As such, the "increased" pulse width in both cases can be the same at 25 μs but with differing Depths of Fields.

The calculation of the pulse width by the exposure control processor 40 is based on the ambient light and influenced by the reflectance of on the scene due to the Pre-flash. The influence on the scene by the flash is estimated in the pre-flash stage and information on ambient light is gathered before the pre-flash stage in the preview period. The pre-flash stage is immediately followed by a main-flash stage in which the camera flash is triggered based on the calculated pulse width so as to allow a user to take a 'normal' high resolution picture.

Information on the ambient light is gathered when a user previews a scene before taking the picture (image capture). During preview, images formed on the imaging sensor are shown on a view-finder display, for example. These "preview" images can be accessed dynamically on a frame-by-frame basis using a statistical model within the image data processor 50 in order to determine the average brightness of a scene, for example. During preview, an auto-focus (AF) algorithm is used to estimate the approximate distance of the target object or objects in the scene. In order to gather information effectively, a low resolution image is used, for example. Furthermore, the exposure time for the preview images can be predetermined.

Based on the information gathered from the preview images, the total exposure, the analog gain on the image data and the size of the iris can be determined so that they can be used for taking the pre-flash stage images. In the pre-flash stage, a dark image captured without flash, and a min_flash image captured with minimum flash intensity are captured. From these two pre-flash stage images, a difference image can be obtained by subtraction, for example.

It is possible that the scene has some reflective surfaces that reflect the flash light back to the camera. For example, people in the scene may wear eye-glasses that reflect the flash light.

If the reflection from the eye-glasses is taken into consideration when computing the target flash intensity, the overall image may become under-exposed. For simplicity, the reflections from the reflective objects are referred to as "mirror reflections".

According to one embodiment of the present invention, mirror reflections are eliminated from the difference image before the difference image is used to determine the camera flash intensity in the main-flash stage. Furthermore, in order to reduce the influence of very bright small objects e.g. ambient lighting (lamps, candles etc) on the exposure estimation, those objects will be eliminated from the difference image. After the mirror reflections and small objects, if any, are eliminated from the difference image, the pixel with the greatest value in the difference image is searched. This pixel is referred to as the "important" pixel because it is considered to be part of the object which is the most influenced by the flash light. After the important pixel is identified, the auto-exposure algorithm estimates the appropriate flash intensity exposure, the gain and the iris to be used in the main-flash stage at least partially based on the luminance of the important pixel.

The present invention provides an auto-exposure algorithm (XAE) for controlling a camera flash. The algorithm uses image processing to identify important areas of the image affected by the flash, while disregarding highly reflective/illuminated areas and uses a neutral density (ND) filter to linearize the flash triggering with highly reflective scenes.

The operation of the XAE in pre-flash stage includes the following steps:

At step 1, exposure time, gain and ND filter settings for the dark image are calculated and stored based upon data acquired from a preview mode.

At step 2, the exposure time for the pre-flash image is set to be equal to the camera's single-frame shutter speed.

At step 3, the important pixel is identified and estimation of the "dark luma" value is performed.

At step 4, the "light luma" value is estimated. Light luma is the increment of the important pixel predicted to result from the flash.

At step 5, luminance is calculated. Luminance is the sum of the dark and light luma.

At step 6, the ND filter is applied and the gain is increased to compensate for the reduction in image signal, if luminance exeeds a target value for the pre-flash.

At step 7, the gain is cropped to a minimum or maximum value, if the gain is below a minimum value or above a maximum value.

At step 8, the values calculated above are stored, and both the dark and pre-flash images are collected. If the xenon module incorporates a photosensor, the pre-flash image is captured with the photosensor disabled.

The operation of the main-flash stage includes the following steps:

At step 1, a window of interest (WOI) proportional in size to the overall pre-flash image is established.

At step 2 the exposure time for the capture with flash is established as being the lesser of either a specified maximum value or the exposure time for the image without flash.

At step 3, frame conversion is performed if needed.

At step 4, frame subtraction is carried out.

At this point, further processing is carried out to avoid the problems of selecting a "wrong" important pixel from the pre-flash images. The potential problems in pre-flash images are described as follows. On the "high resolution" row, the pre-flash image differs from the dark image only in the object position but not in luminance. As a result, the difference image is distorted because the object's position has shifted within the frame. The situation becomes worse if the pre-flash images are acquired at low resolution. At low resolutions, "fake" pixels may appear in the pre-flash image when half of a pixel covers the background while the other half is a part of the object. After the subtraction these pixels remain in the difference image because they actually exist in the pre-flash frame and not in the dark frame. Prediction problems can arise if one of these pixels is selected as the important pixel.

The solution is to remove the boundary pixels of the objects when subtracting the frames, thereby considering only the middle part of the objects when generating the difference image.

Exclusion of the boundary pixels may not be enough to ensure an accurate difference image. There may be overexposed regions in the pre-flash frame resulting from mirror reflections. All overexposed pixels are counted and are compared to the total number of pixels of the image.

At step 5, it is determined whether the percentage of the overexposed pixels exceeds a defined threshold. If the percentage of the overexposed pixels exceeds the threshold, the pre-flash frame is considered to be overexposed and cannot reliably be used for further autoexposure computation. In that case, the luminance is estimated from the average value and the procedure starts at step 9.

Whether the preflash frame is overexposed can be determined by a filtering algorithm.

At step 6, small objects will be discarded. It is assumed that the important pixel cannot be a part of a very small object. Otherwise, the small object will be will exposed but the image as a whole will be dark. Before the filter is run, a copy of the difference image is made.

The operation of the small object filter is straightforward. A pixel mask is once again used, and the center pixel is compared to those surrounding it. Pixels having more than a threshold percentage of the center pixel's difference value are discarded.

At step 7, histograms for RED, GREEN and BLUE colors from the difference image are calculated, and a WOI for this calculation is set.

At step 8, the XAE identifies the important pixel in the WOI within the difference image, accounting for mirror reflection as described above.

Removing correctly illuminated areas that are exposed without using flash which comply with the target of the XAE is an important aspect of the algorithm. This identifies areas in the scene that are already correctly illuminated by for example a light (imagine having a switched on desk lamp within the scene). If this is not detected and removed from the AE calculation, the flash intensity will be reduced and the scene is under exposed. For this particular purpose, the XAE algorithm does not search for well-lit or poorly lit areas. Instead, the algorithm searches areas which will be most lit by the combination of ambient light and flash. Areas overexposed by ambient light and areas behaving like mirrors for xenon light are excluded from those. Thus, if an area is well lit by the ambient light but its brightness is not (or is little) affected by the flash, it will possibly not affect the final flash intensity. If an area is well lit by the ambient light and its brightness is affected by the flash also (this is often situation at hi-light and flash usage forced by user), then main flash intensity will be weak in order not to overexpose this area At step 9, it is determined whether the important pixel is identified. If the important pixel is not found, the parameters in the main-flash stage will use the exposure, gain and iris for capturing without flash and maximum flash intensity and the all other steps will be bypassed.

Once the important pixel is identified, the XAE calculates values for the main-flash capture corresponding to the dark and light luma previously calculated for the pre-flash images (dark_luma_cap & light_luma_cap). If the estimated luminance is too high and no photosensor is available, the ND filter is narrowed and the gain increased in a way that preserves the ratio of gain to ND filter (gain*ND filter).

At step 10, the XAE calculates the exposure, gain, ND filter and flash intensity in the event no photosensor is available on the capture device. Should no photosensor be present, the flash is controlled by the trigger pulse width. The flash module can emit any amount of light between the manufacturer specified minimum and maximum flash intensity. The XAE then calculates the main flash intensity, such that the overall luminance is equal to the target value. If full flash is not enough and the ND filter is opened, the XAE increases the gain up to the maximum value.

At step 11, it is determined whether the flash intensity can reach a certain threshold in order to decide whether or not a photosensor is used if it is present. Should the flash intensity be less than a defined threshold, the photosensor is enabled at step 12. The next step would be to fill the output parameters at step 13.

The photosensor may be configured to regulate the xenon light to achieve uniform brightness levels for different scenes at different distances. If the non-photosensor algorithm determined that full flash should be used, the uniform brightness may not be correct. Thus, the XAE for photosensor can be used only if the object is close enough to be within illumination range.

Using the difference image, the XAE calculates the ratio between the brightness of the important pixel and the average brightness of the difference image. If uniform conditions are used during capture, the average brightness will be the corresponding uniform brightness. The XAE calculates the brightness of the important pixel according to the ratio, mentioned above and the basic brightness. This is the light_luma_cap if basic conditions are used. Then the XAE calculates the light_luma_cap at the initial conditions. The overall brightness of the important pixel at initial conditions is dark_luma_cap as calculated above plus, the light_luma_cap. The XAE then adjusts the gain and ND filter so as to provide the target brightness of the important pixel. The pre-flash image is necessary in this case only to determine how much brighter the important pixel will be compared to the average brightness provided by the photosensor.

The algorithm described above operates in conjunction with a camera having but not limited to an integrated xenon flash module (e.g. an LED flash). Details relating to a preferred embodiment of the system are presented below describing the flash module's modes of operation over various distances and illumination levels.

The primary aim of these xenon flash/camera settings is to ensure that the image data captured during the pre-flash is accurately recorded from the scene so that the AE and AWB algorithms may operate reliably. Where this is not possible, i.e. during AF focus fail, or at extremes of distance, these setting can be used as default settings during capture. This should reduce the occurrence of poorly exposed images.

Figure 2:
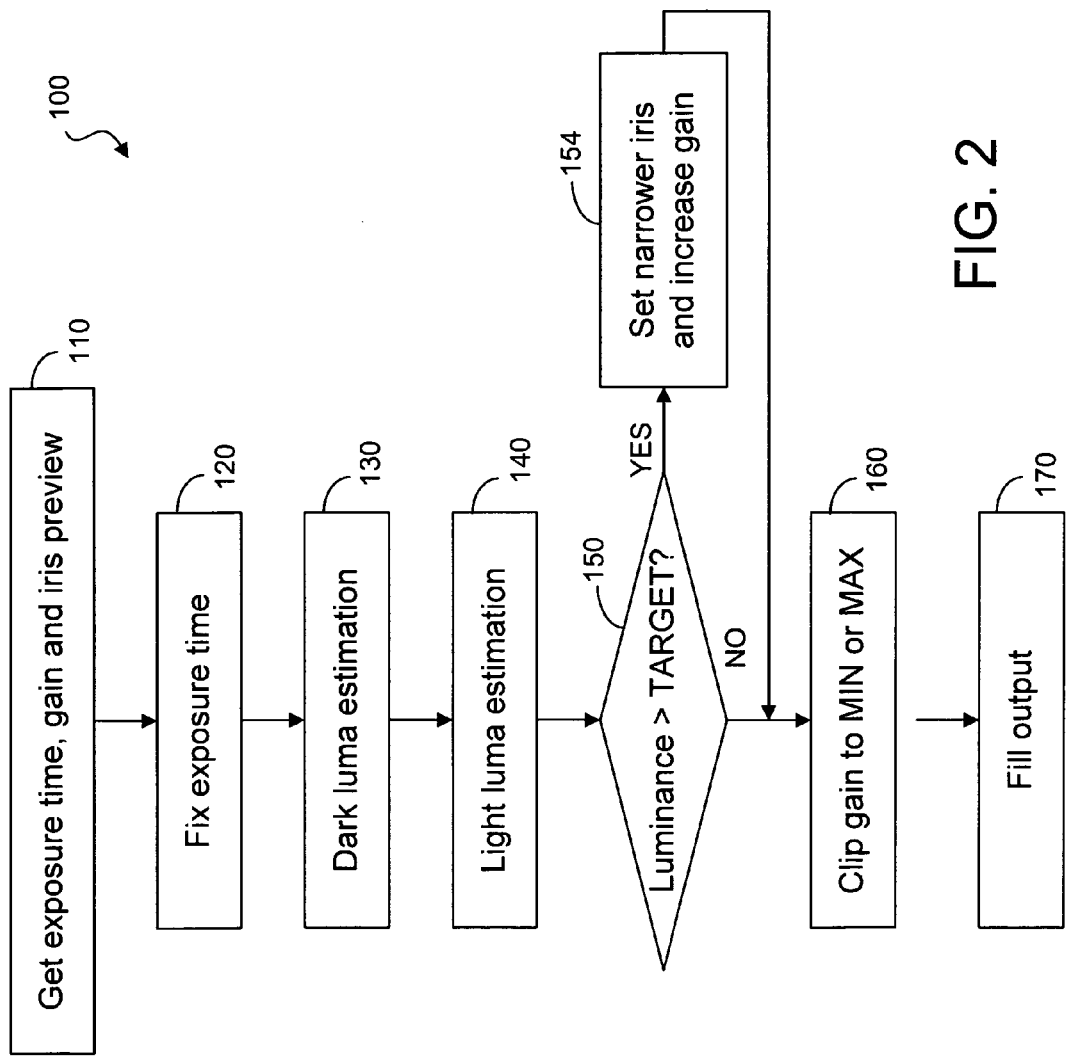
FIG. 2 is a flowchart illustrating the steps for determining the camera settings for capturing pre-flash images.
Figure 3:
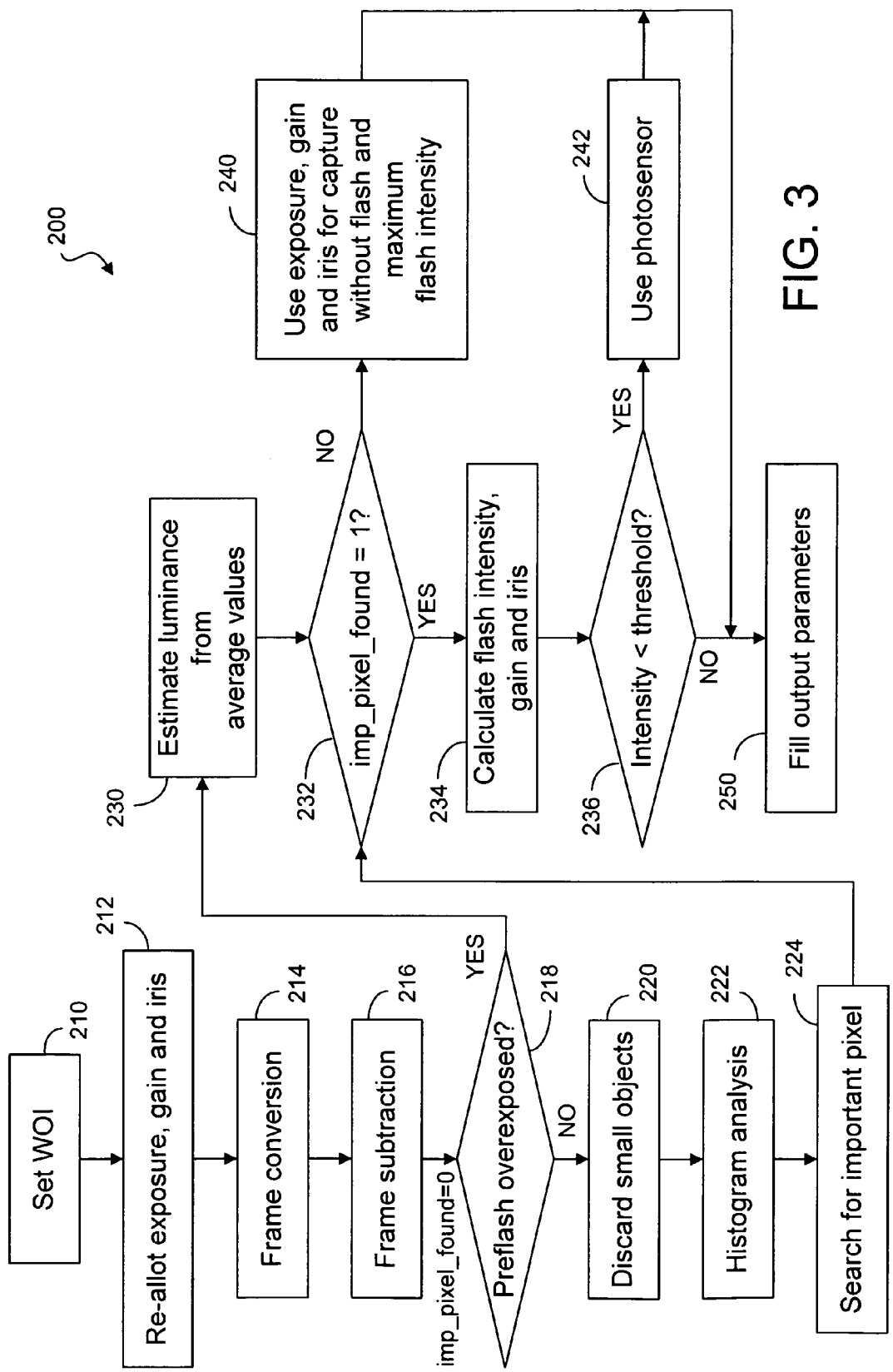
FIG. 3 is a flowchart illustrating the steps for determining the camera settings for capturing main-flash images.

The present invention is further illustrated by the flowcharts as shown in FIGS. 2 and 3 as follows:

Preview Information

Preview images are accessed dynamically on a frame-by-frame basis, using a special statistical module within the image processing IC. The statistical data can be gathered on a low resolution preview image, such as a VGA image, and the image data can be obtained using a rolling shutter at 33 ms, for example. The statistical data, such as the average brightness of the scene or the luminance levels, can be used to determine the total exposure of the pre-flash stage images and the gain of the image data. The auto-focus algorithm applied in the preview stage can gather "distance to target" information so that the flash intensity for the min_flash image can be reduced in a Macro scene or increased when the targets are located beyond a certain distance. Supplementary information on distance can also be assumed when the user selects a 'Scene mode' e.g. macro or landscape etc which can be used to set default values should AF fail. Thus, information gathered from preview images and scene modes are used to set the total exposure, gain and iris for the pre-flash stage.

Mirror Reflection Elimination

In the pre-flash stage, a difference image is obtained from a dark image (without flash) and a min_flash image (with minimum flash intensity). If the value of some pixels in the difference image exceeds a certain threshold (mirror threshold), those pixels can be considered as over-exposed and removed. The mirror threshold can be estimated by histogram analysis of the red, green and blue colors in the difference image, for example.

Pre-Flash Stage

In preparation for taking two pre-flash stage images, the camera settings such as exposure time, gain and iris for taking these images are selected such that the pre-flash stage images will not be overexposed. The steps for selecting the camera settings are illustrated in the flowchart 100 as shown in FIG. 2. At step 110, predetermined camera parameters are estimated and stored. In particular, at step 120, the exposure time is set to be equal to the camera's single-frame shutter speed, such as 33 ms. It should be noted that the capture of the min_flash image in the pre-flash stage is performed with a rolling shutter mode. In this mode, the imaging sensor exposes from top to bottom of the image line by line. The time during which the xenon flash emits light is very short compared to the exposure time. Usually the xenon flash trigger pulse for the pre-flash stage is below 10 μs. For that reason, the exposure time for the pre-flash stage images is set to one frame of 33 ms. At steps 130 and 140, prv_dark_luma and prv_light_luma are estimated, where prv_dark_luma is the average Y level (luminance obtained during the preview) multiplied by a constant tuned to match the specific camera module and defined at SW compile-time value 'C'. This compile-time defined value represents the ratio of the most lit pixel to the average pixel in the preview image.

An example of dark luma calculation is as follows:

```
prv_dark_luma = ave_y_level * C;
prv_dark_luma = (prv_dark_luma * 1_frame_exposure) / prv_exposure;
```

The light luma value in the preview stage is estimated with the help of a look-up table which contains values of the light luma, measured in advance at an exposure time of 33 ms, a gain of ×1 and a wide iris for the distances from 5 cm to 150 cm in 5 cm step, for example. From the AF algorithm, the approximate target distance obtained in the preview stage can be used to select the light luma value from the look-up table. The values in the look-up table correspond to a worst-case "white sheet," i.e. a reflective featureless object, for example.

The light luma may be calculated as follows:

```
    prv_light_luma = luma_vs_dist[obj_dist_index];        //at gain
x1 and no NDF
    prv_light_luma = (prv_light_luma * gain_mult) / 256;  // apply
current gain
    prv_light_luma = (prv_light_luma * blend_mult) /
IRIS_APERTURE_RATIO;
                                             // apply current aperture
or ND filter
```

The main purpose of calculating the dark and light luma values in the preview stage is to set up the camera settings for capturing pre-flash stage images so that these pre-flash stage images will not be too dark or over-exposed in all conditions. If the pre-flash stage images are overexposed, they will not contain reliable information. If they are too dark, the quantization error will become too large compared to the signal. In either case, the data may not be usable for accurate processing in the main-flash stage.

At step 150, luminance, or the sum of prv_dark_luma and prv_light_luma is calculated. If the calculated luminance does not exceed a target value, go to step 160. Otherwise, the iris size is reduced such that the estimated luminance would not exceed the target value at step 154. At the same time, the gain is increased in order to compensate for the reduction of the flash intensity. If the gain is lower than the minimum gain, it is set at the minimum gain. If the gain is greater than the maximum gain, it is set at the maximum gain as step 160. At step 170, the camera settings for the pre-flash stage images are ready for the capturing of the pre-flash stage images.

If the xenon flash module includes a photosensor therein, the photosensor is disabled in the pre-flash stage.

Main Flash Stage

In preparation for taking an image in the main-flash stage, the camera settings such as exposure time, gain, iris and flash intensity are selected. In one embodiment of the present invention, the camera settings for main-flash stage are selected according to the flowchart 200 as shown in FIG. 3.

At step 210, a window of interest (WOI) proportional in size to the overall pre-flash stage image is established. The WOI's dimensions may depend on manual spot weighting (if implemented), but are typically a fractional value of the size of the pre-flash stage image, e.g. ½, ¼ etc.

The WOI defines the area in which the pre-flash stage images are used for information gathering. There are two pre-flash stage images: a dark image captured without flash, and a min_flash image captured with minimum flash intensity.

At step 212 the exposure time for the capture the min_flash image in the pre-flash stage is established. This exposure time should be smaller than a specified maximum value, or shorter than the exposure time for the dark image. If the exposure time for the dark image is greater than the maximum value, the gain and ND filter values are adjusted so that the exposure time will not exceed the maximum value. The adjustment of the exposure time prevents the background from being overexposed.

If needed, frame conversion is performed at step 214. If the pre-flash stage images are not captured in Green Red Green Blue (GRGB) format, they are converted to GRGB format. During the frame convertion the average luminance of the dark image and the min_flash image is calculated as well as average difference. The average difference is the difference between the average luminance of the min_flash image less the average luminance of the dark image.

At step 216, frame subtraction is carried out, where the dark image is subtracted from the min_flash image pixel by pixel. Further processing may be necessary to correct for errors in the subtraction process. Ideally the min_flash and dark images are identical, resulting in a uniformly black difference image, except for the area influenced by the minimum flash intensity. Because the exposure times of the pre-flash stage images are generally long enough, the scene is likely to change slightly, either by user-induced camera shake or by the motion of the objects in the scene.

Figure 4:
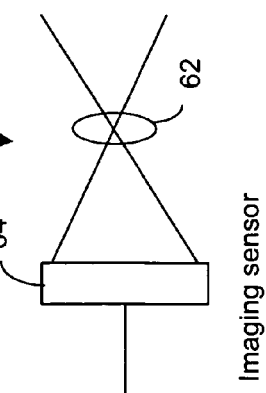
FIG. 4 shows an exemplary filter for use in removing boundary pixels and small object pixels.

In high resolution, the min_flash image differs from the dark image only in the object position but not in luminance. As a result, the difference image is distorted because the object's position has shifted within the frame. The situation becomes worse if the pre-flash stage images are acquired at low resolution. At low resolutions, "fake" pixels may appear in the min_flash image when half of a pixel covers the background and the other half is a part of the object. After subtraction these pixels remain in the difference image because they actually exist in the min_flash frame and not in the dark frame. If one of these pixels is selected as the important pixel, the flash intensity estimation for main-flash stage may contain substantial errors. According to one embodiment of the present invention, the boundary pixels of the objects in the difference image are discarded. As such, only the middle part of the objects in the difference image are considered. Boundary pixels can be eliminated using a filtering algorithm that uses a boundary filter as shown in FIG. 4.

In one embodiment, a 3×3 pixel mask is moved across the min_flash image. The pixel marked "X" in the center of the mask is the pixel indicated for further processing. This pixel is first checked for overexposure. If the pixel is overexposed in the min_flash image, but the pixel in the same position in the dark image is not, overexposure is determined to be the result of the min_flash and adjacent pixels are then checked. Second, a pixel adjacent to an overexposed pixel is also discarded. Third, the algorithm estimates vertical, horizontal, and diagonal gradients to determine whether the pixel is at a boundry. An exemplary gradient estimation technique is shown below:

```
hor_grad = | L – R |;      // horizontal gradient
ver_grad = | U – D |;      // vertical gradient
diag1_grad = | UL – DR |;  // first diagonal gradient
diag2_grad = | UR – DL |.  // second diagonal gradient
```

The estimated gradients are then compared with the center pixel. If the ratio of gradient to center pixel exceeds a predetermined threshold, the pixel is considered to be at a boundary and is discarded.

The filter may be run in parallel with the frame subtraction, and the output stored directly in the difference image buffer. In this case the min_flash and the dark images are not lost.

Exclusion of the boundary pixels may not be enough to ensure an accurate difference image. There may still be some overexposed regions in the min_flash image resulting from mirror reflections. Thus, when the mask is moved across the min_flash image, the over-exposed pixels are counted, and the ratio of the total number of over-exposed pixels to the total number of the image pixels is calculated. At step 218 it is determined whether the ratio exceeds a pre-determined threshold. If the ratio exceeds the threshold, the min_flash frame is considered to be over-exposed and cannot reliably be used for further autoexposure computation. In that case, the luminance is estimated from the average pixel values at step 230.

If the min_flash frame is not overexposed, the process will proceed to step 220, where small objects are discarded in the difference image in order to reduce the influence of bright but small objects on the exposure estimation. At step 220, the difference image is filtered using the same mask as shown in FIG. 4. During filtering, the center pixel is compared to the surrounding pixels. If the value of a center pixel is higher than the surrounding pixels by a certain percentage, the center pixel and its surrounding pixels may belong a small object. These pixels should be discarded so that the important pixel will not be a part of such a small object.

At step 222, histograms for RED, GREEN and BLUE colors from the difference image are calculated, and a WOI for this calculation is set. After the estimation of the histograms, the images are examined separately for the three colors. Each color has a value ranging from 0 to 255, and a first derivative for each value is calculated. If the value of the first derivative exceeds a given threshold, the search is stopped and the value is returned. Essentially, a slope in the histogram is identified and this value becomes the mirror threshold value. This histogram analysis step is used to identify mirror reflections.

At step 224, the auto-exposure algorithm identifies the important pixel in the WOI within the difference image, disregarding the mirror reflections and small objects. The important pixel is the pixel with the highest value within the WOI. The important pixel can be either red, green or blue. If the pixel is red or blue, the neighboring pixels are checked. If the color of the area is very strong (e.g. red>2*green), the corresponding red or blue pixel is not considered important, because the pixel may be overexposed and is not considered as the important pixel.

It should be noted that color images are constructed from a Bayer pattern of pixels in blocks of 4 pixels consisting of 2 greens, 1 blue and 1 red. Various reconstruction methods can be used, but the green pixels in general are used to provide the luminance information (image brightness) and then the proportions of the RGB give the chrominance (color) information. Thus, it would be sufficient to obtain the Green important pixel for determining the luminance. Scenes containing other dominant colors are also checked to make sure that there are no overexposed areas in those scenes. This will not produce a significant change in the color of the main flash image. However if the area does not have strong color, overexposing either pixel will produce changing (or so called "burning" of the color). Thus red and blue pixels can be considered important in some cases.

At step 232, it is determined whether the important pixel is identified. In the event that the important pixel cannot be found, the camera settings for use in the main-flash image capturing will be the exposure, gain and iris used for capturing the dark image, but the flash intensity will be set at maximum at step 240. In most cases, the important pixel is found at step 232, and the camera settings will be calculated at step 234, assuming that the photosensor is not used.

Using the difference image, the auto-exposure algorithm calculates the ratio between the brightness of the important pixel and the average brightness of the difference image. The auto-exposure algorithm uses the sum of dark_luma and light_luma to calculate the flash intensity for the main-flash image, which is determined mainly by the trigger pulse width. The dark_luma value is the value of the important pixel in the dark image and the light_luma is the value of the important pixel in the min_flash image.

The calculation of the trigger pulse width is described as follows:

As mentioned earlier, the dark and pre-flash images are captured with same exposure/gain. The difference ("diff_luma") is a measure of scene reflectance to the xenon light. dark_luma is a measure of ambient light. Exposure time is not changed by the XAE algorithm (it is calculated during preview for the case no xenon will be used). Its aim is to keep the scene best lit by the ambient light, xenon should only add light where it is necessary. Another aim of XAE is to minimize gain used and compensate by xenon light. Exposure time affects only the brightness, achieved from the ambient light, not from xenon. Gain and aperture affect both ambient and xenon light. They are controlled by XAE if needed, but their maximum values equal to those, requested by preview AE for the case of no flash will be used. This is to force XAE to leave overexposed areas, which were decided to be overexposed by ambient light by normal (no flash) AE. XAE tries to use same aperture, which is requested by non-flash AE during preview. If the scene is too close and even minimum flash will overexpose it, then XAE decreases the aperture.

By knowing exp/gain/iris for dark/preflash images (exp_dark, gain_dark, iris_dark) and recommended values for capture (exp_capture, iris_capture), XAE calculates the dark_luma and diff_luma, as they would appear in capture is preflash intensity, is used for main capture, starting from gain_capture=×1.

```
dark_luma_capture =
    dark_luma * exp_capture/exp_dark * gain_capture/gain_dark *
iris_capture/iris_dark
    diff_luma_capture = diff_luma * gain_capture/gain_dark *
iris_capture/iris_dark
```

Here dark_luma_capture and diff_luma_capture are calculated for each pixel and each color (R,G,B) of the images passed to XAE (they are downscaled versions of dark and preflash images).

It is followed that the pixel with maximum dark_luma_capture+diff_luma_capture, (which is not overexposed in dark_luma_capture and is not a mirror reflection) is found.

This pixel is involved in the calculations from now on.

Because xenon intensity affects only diff_luma_capture, the necessary xenon intensity for capture can be computed as follows:

```
xenon_capture =
    xenon_preflash * (target_luma − dark_luma)/diff_luma_capture
diff_luma_capture = diff_luma_capture * xenon_capture/
xenon_preflash
if (xenon_capture > max possible xenon intensity) then recalculate
gain_capture:
    gain_capture = gain_capture * target_luma /
(dark_luma_capture + diff_luma_capture)
if (xenon_capture < min possible xenon intensity) then reduce
the aperture:
    iris_capture = iris_capture * target_luma /
(dark_luma_capture + diff_luma_capture)
```

Xenon intensity is reported by the XAE in terms of percentage of full xenon energy (min. 100%). Typically, preflash intensity is minimum 'min'. This is the minimum energy that can be emitted and which is repeatable enough (e.g. +/−20%)

The xenon flash driver will then convert this value to the required trigger pulse width in one such embodiment, and a look-up table is used. Alternative calculation methods, however, can also be used.

The main flash intensity is estimated such that the overall luminance is equal to the threshold or target value, as determined at step 236.

If the overall luminance is higher than the threshold and no photosensor is available, the iris or aperture is reduced while the gain is changed such that the product of the gain and aperture remains unchanged.

If the overall luminance is smaller than the target value, the auto-exposure algorithm increases the gain up to the maximum value and a decision is made at step 242 whether to use a photosensor to control the flash intensity. When the photosensor is used, it cuts off the flash output when the sensed intensity reaches a threshold value. If full flash is not enough to expose the image correctly, the iris will be opened wide (and the ND filter removed). The gain is also increased up to the maximum value to provide the brightest image possible.

The basic feature of a photosensor is that it can be used to regulate the flash intensity to achieve substantially the same average brightness for different scenes and for different target distances. The photosensor is tuned to a brightness threshold according to the sensitivity of the sensor, the average brightness of an image can be calculated or otherwise measured, which will be obtained when using a photosensor and a given camera module analog gain and aperture in perfectly dark conditions with no ambient light, let this value be known as 'Basic Brightness'. The exposure time is not critical.

In summary, the present invention provides an auto-exposure algorithm for use with a camera flash, such as a xenon flash. A shape recognition algorithm such as Xenon Auto-Exposure (XAE) shape recognition algorithm is used to identify the reflectance/luminance of important objects identified in a preview and pre-flash scene, (e.g., reflective surfaces, mirrors, lights) and then make camera adjustments for example by adjusting the flash intensity, camera aperture (ND filter), and gain (ISO film speed) to provide an optimally exposed image. It also uses the ND filter in a novel way to extend the dynamic range of the flash intensity control and overcome the non linearity of the xenon flash at low light intensity levels, i.e. for highly reflective or close-in (macro) scenes. Such an algorithm may be divided into two stages: pre-flash and main-flash.

In the pre-flash stage, two images with uniform exposure, gain and aperture dimensions are captured in a "preview mode." Both images are typically acquired in resolutions lower than that of the final capture. The first image, called the "dark image," is captured without a flash, while the second, called the "pre-flash image," is captured with a minimum intensity flash. The minimum intensity flash threshold is defined by the xenon flash module luminance efficiency and total energy storage. Information about ambient illumination and the influence of the minimum intensity flash can be extracted from the pre-flash images and provided as an input to the main-flash stage.

In the main-flash stage a "difference image" is calculated by subtracting the dark image from the pre-flash image. Ideally, the difference image will contain only regions which are influenced by the flash. This influence is evaluated by identifying the pixel with the greatest difference value. This pixel is dubbed the "important pixel" and it is considered to be the part of the photographed object which is most influenced by the minimum intensity pre-flash. In isolating the important pixel, those pixels considered to be the result of mirror reflection may be discarded.

Calculations are made based on the illumination of the important pixel. For example using a look-up table for the flash intensity, the final intensity is calculated as well as the exposure, gain and ND filter (or aperture) for capture.

The operation of the XAE algorithm along with image capturing can be summed up by the following steps:

capturing a first test image (dark image) without using a flash;

capturing a second test image (pre-flash image) using the flash with a predetermined intensity;

obtaining a difference image indicative of a difference between the second test image and the first test image, wherein the difference image comprises a plurality of difference image pixels, each difference image pixel having a pixel value;

identifying a reference pixel among the difference image pixels, wherein the first test image comprises a first test pixel corresponding to the reference pixel (important pixel), and the second test image comprises a second test pixel corresponding to the reference pixel, wherein the reference pixel is identified based on a highest pixel value among the difference image pixels; and computing illumination amount by the flash for subsequent image capturing based on pixel value of the first test pixel and pixel value of second test pixel.

It would be desirable to remove some of different image pixels belong to small objects or reflective objects. Objects smaller than a predetermined size can be identified based on number of contiguous pixels in a pixel array having a highest pixel value among the difference image pixels by using a pixel filter to remove the edge pixels of the array, and comparing the remaining pixels with the predetermined size, for example. Reflective objects can be identified by performing a histogram analysis on the color image pixels for determining the reflective objects and removing the reflective objects based on the slope or the first derivative of the histogram, for example.

Before capturing the first test image and the second test image, it is necessary to determine the camera settings, wherein the camera settings comprise an exposure time and the predetermined intensity of the flash. The average luminance of one or more preview images can be used for setting the predetermined intensity of flash such that average luminance of the second test image is within a predetermined range, for example.

According to various embodiments of the present invention, the illumination amount by the flash for the subsequent image capturing is achievable by causing the flash to provide flash intensity by a trigger pulse having a pulse width, wherein when the pulse width is smaller than a predetermined value, the pulse width is increased and the flash intensity is reduced by a neutral density or an iris so as to maintain the illumination amount by the flash.

If the first test image or the dark image contains correctly illuminated areas, the corresponding areas in the difference image should be removed before identifying the reference or important pixel and computing the flash intensity of the flash for the main-flash stage. The correctly illuminated areas can be identified from the dark image by the pixel values of the dark image within a certain predetermined range.

The XAE algorithm can be implemented by a software program embedded in a computer readable storage medium, which can be part of a processor in a flash module or in camera having a flash module. The flash module may include a mechanism for triggering the camera flash; and a processor arranged to receive image data from the camera. The processor is adapted to carry out: capturing a first test image without using the camera flash; capturing a second test image using the camera flash with a predetermined intensity; obtaining a difference image indicative of a difference between the second test image and the first test image, wherein the difference image comprises a plurality of difference image pixels, each difference image pixel having a pixel value; identifying a reference pixel among the difference image pixels, wherein the first test image comprises a first test pixel corresponding to the reference pixel, and the second test image comprises a second test pixel corresponding to the reference pixel; and computing illumination amount of the flash for subsequent image capturing based on pixel value of the first test pixel and pixel value of the second test pixel.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method, comprising:
capturing a first test image without using a flash;
capturing a second test image using the flash with a predetermined intensity;
obtaining a difference image indicative of a difference between the second test image and the first test image, wherein the difference image comprises a plurality of difference image pixels, each difference image pixel having a pixel value;
identifying a reference pixel among the difference image pixels, wherein the first test image comprises a first test pixel corresponding to the reference pixel, and the second test image comprises a second test pixel corresponding to the reference pixel; and
computing illumination amount by the flash for subsequent image capturing based at least partly on pixel value of the first test pixel and pixel value of second test pixel, wherein the illumination amount by the flash for the subsequent image capturing is achievable by causing the flash to provide flash intensity by a trigger pulse having a pulse width, wherein when the pulse width is smaller than a predetermined value, the pulse width is increased and the flash intensity is reduced accordingly so as to maintain the illumination amount by the flash.

2. The method of claim 1, wherein the reference pixel is identified based at least partly on a highest pixel value among the difference image pixels.

3. The method of claim 1, further comprising:
removing one more of the difference image pixels belonging to objects smaller than a predetermined size in the difference image before said identifying.

4. The method of claim 3, wherein each of the objects smaller than the predetermined size is identified based at least partly on number of contiguous pixels in a pixel array having a highest pixel value among the difference image pixels.

5. The method of claim 4, wherein the pixel array comprises a plurality of edge pixels, said method comprising:
applying a pixel filter to remove the edge pixels for obtaining remaining pixels in the pixel array, wherein the number of remaining pixels is used to compare with the predetermined size.

6. The method of claim 1, further comprising:
removing some of the difference image pixels belonging to reflective objects in the difference image before said identifying.

7. The method of claim 6, wherein the difference image pixels comprise color image pixels, said method further comprising:
performing a histogram analysis on the color image pixels for determining the reflective objects.

8. The method of claim 1, further comprising:
determining camera settings for the capturing of the first test image and the second test image, wherein the camera settings comprise an exposure time and the predetermined intensity of the flash, wherein average luminance of one or more preview images are used for setting the predetermined intensity of flash such that average luminance of the second test image is within a predetermined range.

9. The method of claim 1, wherein a neutral density filter is used to reduce the flash intensity.

10. The method of claim 1, wherein an iris is used to reduce the flash intensity.

11. The method of claim 1, wherein the first test image comprises a plurality of first image pixels, each of the first pixels has a pixel value, said method further comprising:
determining in the first test image areas having first image pixels with pixel values within a predetermined range;
removing corresponding areas in the difference image before said computing.

12. A flash module for use in a camera, the module adapted to control a camera flash, said module comprising:
a mechanism for triggering the camera flash; and
a processor arranged to receive image data from the camera, wherein the processor is adapted to carry out:
capturing a first test image without using the camera flash;
capturing a second test image using the camera flash with a predetermined intensity;
obtaining a difference image indicative of a difference between the second test image and the first test image, wherein the difference image comprises a plurality of difference image pixels, each difference image pixel having a pixel value;
identifying a reference pixel among the difference image pixels, wherein the first test image comprises a first test pixel corresponding to the reference pixel, and the second test image comprises a second test pixel corresponding to the reference pixel; and
computing illumination amount by the flash for subsequent image capturing based at least partly on pixel value of the first test pixel and pixel value of the second test pixel;
further comprising a neutral density filter, wherein the illumination amount by the flash for the subsequent image capturing is achievable by causing the flash to provide flash intensity by a trigger pulse having a pulse width, wherein when the pulse width is smaller than a threshold value, apply the neutral density filter to reduce the flash intensity while increasing the pulse width so as to maintain the illumination amount by the flash.

13. The flash module of claim 12, wherein the processor comprises a software program having programming codes for performing said obtaining, identifying and said computing.

14. The flash module of claim 12, further comprising an iris, wherein the illumination amount by the flash for the subsequent image capturing is achievable by causing the flash to provide flash intensity by a trigger pulse having a pulse width, wherein when the pulse width is smaller than a threshold value, apply the iris to reduce the flash intensity while increasing the pulse width so as to maintain the illumination amount by the flash.

15. A computer readable storage medium embedded therein a software program for use in a camera, said software program comprising programming codes for carrying out the method of claim 1.

16. A camera, comprising:
a flash module as defined in claim 10;
an imaging sensor; and
an optical module for forming an image on the imaging sensor, wherein the imaging sensor is configured to provide the image data.

17. An apparatus, comprising:
means for capturing a first test image without using a flash and a second test image using the flash with a predetermined intensity;
means for obtaining a difference image indicative of a difference between the second test image and the first test image, wherein the difference image comprises a plurality of difference image pixels, each difference image pixel having a pixel value;
means for identifying a reference pixel among the difference image pixels, wherein the first test image comprises a first test pixel corresponding to the reference pixel, and the second test image comprises a second test pixel corresponding to the reference pixel; and
means computing illumination amount by the flash for subsequent image capturing based at least partly on pixel value of the first test pixel and pixel value of second test pixel, wherein the reference pixel is identified based at least partly on a highest pixel value among the difference image pixels, wherein the illumination amount by the flash for the subsequent image capturing is achievable by causing the flash to provide flash intensity by a trigger pulse having a pulse width, wherein when the pulse width is smaller than a predetermined value, the pulse width is increased and the flash intensity is reduced accordingly so as to maintain the illumination amount by the flash.

18. The apparatus of claim 17, further comprising:
means for removing one more of the difference image pixels belonging to objects smaller than a predetermined size in the difference image, and some of the difference image pixels belonging to reflective objects in the difference image before identifying the reference pixel.

* * * * *